Nov. 27, 1951     H. N. IRVINE ET AL     2,576,183
DEVICE FOR COOKING DOUGHNUTS
Filed July 3, 1947                 2 SHEETS—SHEET 1
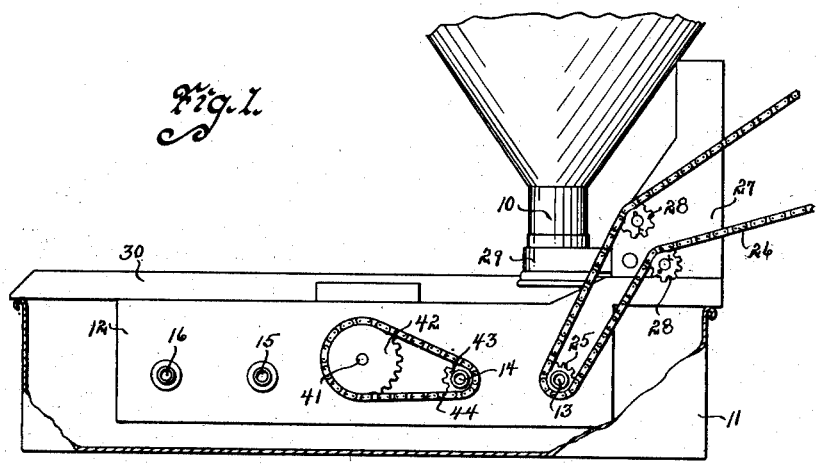
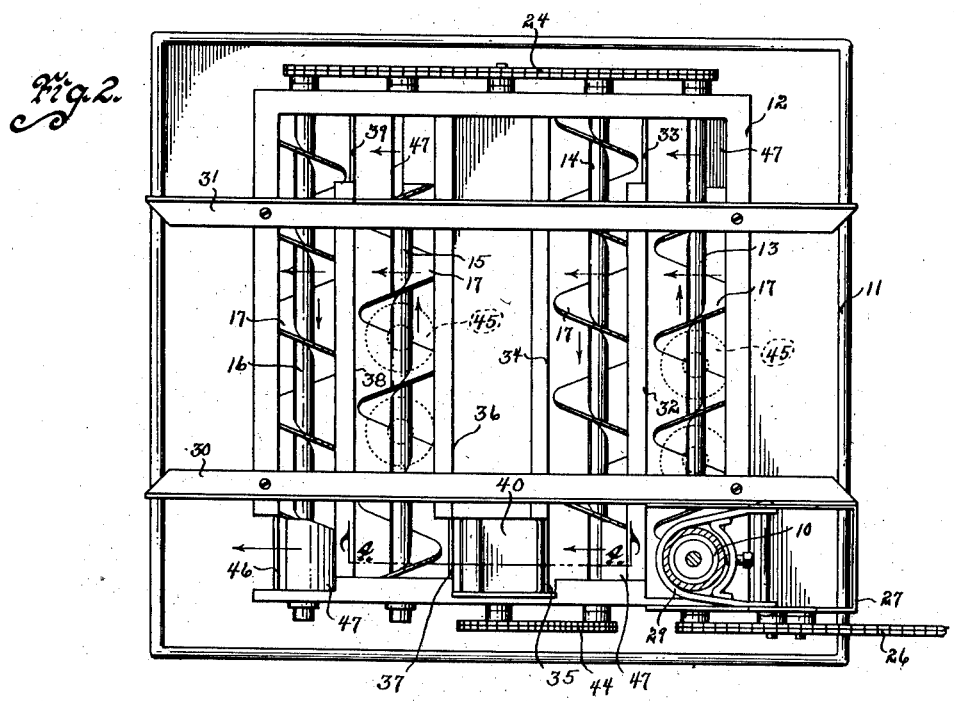
Inventors
Houston N. Irvine & Kenneth L. Magee
by M. Talbert Dick
Attorney
Witness
Edward P. Seely

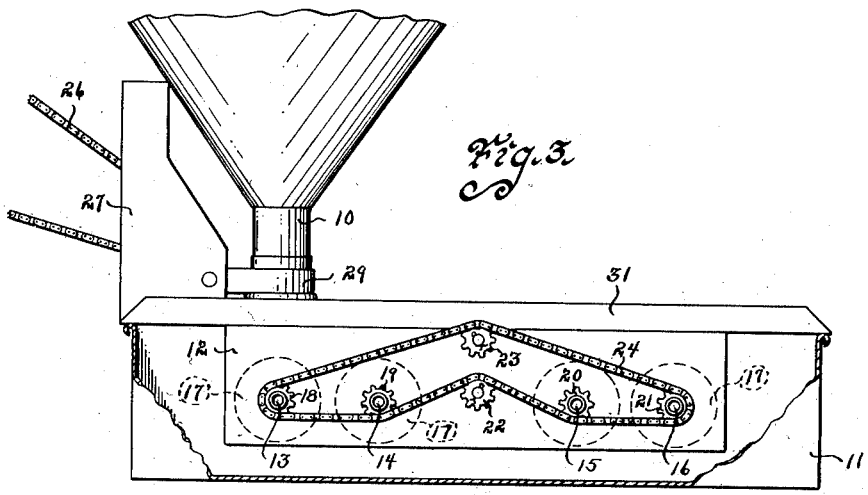
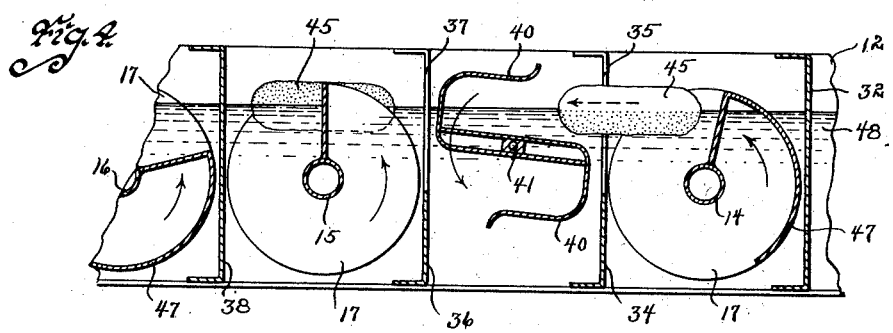
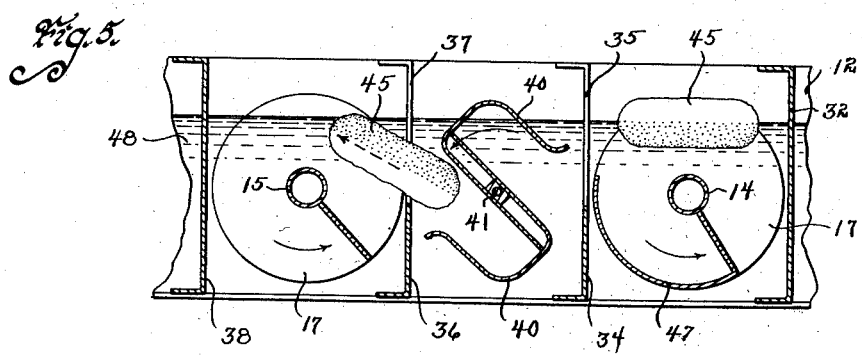

Patented Nov. 27, 1951

2,576,183

UNITED STATES PATENT OFFICE 2,576,183

DEVICE FOR COOKING DOUGHNUTS

Houston N. Irvine and Kenneth L. Magee, Burlington, Iowa

Application July 3, 1947, Serial No. 758,902

6 Claims. (Cl. 99—405)

The principal object of our invention is to provide an automatic doughnut cooking machine that is economical in manufacture, durable in use, and refined in appearance.

A further object of this invention is to provide a method of cooking doughnuts, wherein the cooking fat or like is agitated and flowed, thereby not only keeping the cooking liquid of uniform even temperature, but acting as a vehicle to the doughnut cake as it passes through the machine.

A still further object of our invention is to provide a doughnut cooking machine that may be used in substantially all fat cooking vats without change.

A still further object of this invention is to provide a doughnut cooking machine that may be easily and quickly removed from the vat and is as easily cleaned and kept in a sanitary condition.

These and other objects will be apparent to those skilled in the art.

Our invention consists in the construction, arrangement and combination of the various parts of the device, whereby the objects contemplated are attained as hereinafter more fully set forth, pointed out in our claims and illustrated in the accompanying drawings, in which:

Fig. 1 is a side view of our machine secured to a doughnut cake ejector machine and a cooking vat.

Fig. 2 is a top plan view of our machine in use.

Fig. 3 is an end view of the device.

Fig. 4 is an enlarged cross-sectional view of the machine taken on line 4—4 of Fig. 2 and more fully illustrates its construction.

Fig. 5 is an enlarged cross-sectional view of the doughnut turning portion of the device.

The objections to most doughnut cooking machines are that they are complicated, hard to clean, very expensive, do not uniformly cook the doughnut during its subjection to the hot cooking fat, and in many instances distort the doughnut cake during the cooking process, thereby making for imperfect doughnuts. We have overcome such objections by providing a simple machine having a plurality of rotating augers that not only properly circulate the cooking fat, but move the cooking fat or like with the doughnut cakes during the cooking process.

Referring to the drawings, we have used the numeral 10 to designate the orifice end of an ordinary dougnut forming machine. Such machines are old in the art and our device is designed particularly for use in combination with such machines. The numeral 11 designates a vat for holding the cooking fat in which the doughnuts are fried. This vat may be of any suitable design and depth. It is into such a vat that we suspend our machine and which we will now describe in detail.

The numeral 12 designates the frame of our device which is rectangular in construction and open at its top and bottom. The numerals 13, 14, 15, and 16 designate four auger shafts extending horizontally and journaled through the two ends of the frame 12, as shown in Fig. 2. The numeral 17 designates a spiral auger fin embracing each of the shafts 13, 14, 15, and 16. The numerals 18, 19, 20, and 21 designate spur gears rigidly secured on the forward ends of each of the shafts 13, 14, 15, and 16, respectively. The numerals 22 and 23 designate two idler gears rotatably mounted on the forward end of the frame 12. The numeral 24 designates an endless chain embracing the two spur gears 18 and 21 and engaging the lower portions of the spur gears 19 and 20, as shown in Fig. 3. This is accomplished by the lower portion of the chain 24 riding over the idler gear 22 and the upper portion of the endless chain riding over the idler gear 23, as shown in Fig. 3. The numeral 25 designates a spur gear rigidly mounted on the rear end of the shaft 13. The numeral 26 designates an endless chain embracing the spur gear 25 and is designed to be in communication with a prime mover. This may be the same prime mover that operates the doughnut forming machine 10. The numeral 27 designates a housing secured to the frame 12 at its rear right corner. This housing carries the two idler gears 28 and the clamping bracket 29. This clamping bracket 29 is designed to detachably engage and be secured to the outlet end of the doughnut forming machine 10, as shown in the drawings. By this arrangement, our complete machine may be supported by the doughnut forming machine 10 and swung with the same from the vat 11 when desired. In normal use, however, our machine would substantially rest on the upper marginal edge of the vat 11 and this is accomplished by two bars 30 and 31 secured to the top of the frame 12 and extending over the top marginal edge of the vat 11, as shown in Fig. 2. The clamping bracket 29 is so positioned that the discharge end of the doughnut forming machine 10 is directly over the rear end portion of the shaft 13. Due to the rotation of the prime mover and the hook-up of the shafts the auger shafts 13, 14, 15, and 16 will all rotate to the left. However, the auger fin 17 is so wound on the shaft 13 as to move material forwardly. The same is true of the spiral auger fin on the shaft 15. However, the spiral fins on the shafts 14 and 16 are oppositely wound in order to move material to the rear. The numeral 32 designates a vertical wall in the frame 12 and extending between the auger shafts 13 and 14. The numeral 33 designates a cut-away portion in the upper forward end of the wall 32 to provide a doughnut and hot grease passageway from the auger shaft 13 to the auger shaft 14. The numeral 34 designates a second vertical wall secured in the frame 12 and positioned to the left of the auger shaft 14, as shown in Fig. 2. This wall has its upper rear end portion cut away to form a doughnut and liquid passageway 35 to the left of the rear end portion of the auger shaft 14, as shown in Fig. 4. The numeral 36 designates a third vertical wall within the frame 12 and positioned to the right of the auger shaft 15 and in spaced relationship to the wall 34. This wall 36 has its upper rear end portion cut away to form a doughnut and liquid passageway 37 at the right of the rear end portion of the auger shaft 15. The numeral 38 designates a fourth wall within the frame 12 and positioned to the right of the auger shaft 16. This wall has its forward upper end portion cut away to form a doughnut and liquid passageway 39 at the forward right side of the auger shaft 16. These walls 32, 34, 36, and 38 are parallel to each other and with the solid sides of the frame 12 provide a longitudinal trough for the operation of each of the auger shafts. The wall 34 is spaced from the wall 36, as shown in Fig. 2, to provide space for the doughnut turning means. This turning means is shown in detail in Figs. 4 and 5 and is accomplished by a double cup construction 40 S-shape in cross-section. This member 40 is secured to a rotatable shaft 41 which in turn carries a large spur gear 42. The numeral 43 designates a small spur gear on the rear end of the shaft 14. The numeral 44 designates an endless chain embracing the gears 42 and 43. The member 40 rotates between the passageway 35 and the passageway 37 and is timed to rotate properly in timed relationship to the auger shafts. When a doughnut cake 45 passes through the passageway 35 one of the cup portions of the member 40 will be in substantially the position as shown in Fig. 4 and the doughnut cake will pass into this cup portion of the device. With the cup portion rotating to the left it will carry and turn the doughnut cake over, releasing the floatable doughnut cake in a turned-over position as it rotates, as shown in Fig. 5. In one-half revolution the other cup member of the member 40 will be in a horizontal position to receive the next oncoming doughnut. By this arrangement, the doughnut cakes passing from the vicinity of the auger shaft 14 to the auger shaft 15 will be turned completely over in order to cook the other side of the doughnut cake. The numeral 46 designates a doughnut passageway cut in the rear upper portion of the left side wall of the frame 12. It is through this passageway 46 that the doughnut passes from our machine in a cooked condition. This movement of the doughnut cakes through the passageways 33, 35, 37, 39, and 46 is facilitated by circular fins 47 on the auger shafts 13, 14, 15, and 16, respectively, and adjacent the passageways, respectively.

The practical operation of the device is as follows: The doughnut forming machine will deposit a formed doughnut directly above the rear portion of the auger shaft 13 and by timing this machine properly with the rotation of the auger shaft 13, the doughnut will fall into the hot grease and not onto the upper marginal edge of the spiral fin of the auger. The hot cooking fat or like 48 should extend up into the frame 12 substantially as shown in the drawings. This means that the auger fins of the auger shafts are substantially immersed in the hot cooking liquid and the hot cooking liquid between the right side of the frame and the wall 32 will move forwardly, carrying with it the doughnut cake. With the machine properly timed, a doughnut cake will be dropped between each of the spirals of the auger, as shown in Fig. 2. As a doughnut cake reaches the forward end of the machine the member 47 on the shaft 13 will move the doughnut cake and liquid through the passageway 33 to a position above the forward end of the shaft 14 and the auger embracing this shaft will circulate the hot cooking liquid to the rear between the walls 32 and 34, thereby carrying the doughnut to the rear of the machine where it is flowed through the passageway 35 at the rear of the machine by action of the member 47 on the shaft 14. At this time the lower half of the doughnut cake is substantially browned and is automatically turned over by the member 40, as hereinbefore described. The turned-over doughnut cake moves directly through the passageway 37 and above the shaft 15. The spiral auger of the shaft 15 will move the doughnut and hot cooking fat between the walls 36 and 38, forwardly until the doughnut cake reaches the forward end of the machine and adjacent the passageway 39. The member 47 on the shaft 15 will move the doughnut and liquid through the passageway 39 and over the forward end portion of the shaft 16. The auger on the shaft 16 will cause the hot cooking liquid between the wall 38 and the left side of the frame 12 to move to the rear, thereby carrying the doughnut to the rear of the machine and adjacent the exit passageway 46. The member 47 on the shaft 16 facilitates the movement of the doughnut and liquid through the passageway 47, after which the cooked doughnut may be retrieved manually or by automatic means as a finished unmarred doughnut. From this explanation, it will readily be seen that the movement of doughnut cakes through the machine will be continuous and timed, and with the movement and action of the doughnuts visible throughout the process. By the augers being substantially immersed in the frying liquid, the liquid will be forced to move forth and back in the provided troughs of the machine, thereby floating and carrying the doughnut cakes through the machine without injury. Obviously, this would not be true if the cooking liquid were tranquil and metallic doughnut engaging means engaged and moved the doughnuts over the surface of the relatively still cooking liquid. By our machine the liquid and doughnuts are moved as a unit and therefore the soft doughnut cake before it is cooked is not distorted nor damaged. Another important feature of the flowing of the hot cooking liquid is that its agitation within the vat 11 renders it of substantially even temperature throughout its mass, thereby causing the doughnut cake to cook faster and for the doughnuts emerging from our machine to be all uniformly cooked.

The members 47 may be of different designs, but we find that the structure shown in the drawings is very satisfactory. They each merely consist of a radially extending portion extending from the auger shaft and then curved in a semicircle with the diameter substantially the diameter of the auger fin 17, as shown in Fig. 5. The semi-circular portion should always be bent, however, opposite from the direction of rotation of the shaft in order that a substantially flat surface will contact the liquid carrying the doughnut to force the same through the adjacent passageway. The inner side of the member 47 should be rigidly secured to and a continuation of the auger fin adjacent to it, as shown in Fig. 2.

Some changes may be made in the construction and arrangement of our improved method of and means for cooking doughnuts without departing from the real spirit and purpose of our invention, and it is our intention to cover by our claims, any modified forms of structure or use of mechanical equivalents which may be reasonably included within their scope,

We claim:

1. In a doughnut cooking machine, a frame, a means for suspending said frame in a vat of hot cooking liquid, a plurality of horizontal auger elements rotatably mounted in said frame, some of which are spiraled in the opposite directions, vertical partition walls for separating said auger elements from each other, doughnut cake passageways in some of said walls, a doughnut cake turning means on said frame, and a chain means for operatively connecting said auger elements and said doughnut cake turning means together for synchronized movement.

2. In a doughnut cooking machine, a frame, a means for suspending said frame in a vat of hot cooking liquid, a plurality of horizontal auger elements rotatably mounted in said frame, some of which are spiraled in the opposite directions, vertical partition walls for separating said auger elements from each other, doughnut cake passageways in some of said walls, a doughnut cake turning means on said frame, a chain means for operatively connecting said auger elements and said doughnut cake turning means together for synchronized movement, and a clamping means for securing said frame to a doughnut cake making machine.

3. In a doughnut cooking machine, a frame, a means for suspending said frame in a vat of hot cooking liquid, a plurality of horizontal auger elements rotatably mounted in said frame, some of which are spiraled in the opposite directions, vertical partition walls for separating said auger elements from each other, doughnut cake passageways in some of said walls, a doughnut cake turning means on said frame, a chain means for operatively connecting said auger elements and said doughnut cake turning means together for synchronized movement, and a propeller means on each of said auger elements for causing the hot cooking liquid and doughnuts to pass through said doughnut cake passageways.

4. In a doughnut cooking machine, a horizontal frame having its sides and ends closed and its top and bottom open, an auger element rotatably mounted in said frame and adjacent its right side wall, a second auger element rotatably mounted in said frame, parallel with said first-mentioned auger element but having its spiral thread in the opposite direction, a vertical wall partition on said frame located between said first and second-mentioned auger elements, a passageway in said wall, a propeller element on said first-mentioned auger element designed to cause hot cooking liquid and doughnuts to pass through said passageway, a third auger element rotatably mounted in said frame, parallel with said first-mentioned two auger elements and having a spiral thread similar to that of said first-mentioned auger element, two spaced apart vertical partition walls on said frame positioned between said second and third auger elements, a passageway in each of said last-mentioned two partition walls, a rotatably mounted doughnut turning means on said frame and between said passageways in said last-mentioned two partition walls, a propeller element on said second auger element for causing liquid and doughnuts to pass through one of said last-mentioned passageways to said doughnut turning means, a fourth auger element rotatably mounted in said frame parallel with said third-mentioned auger element and adjacent the left side wall of said frame, a vertical partition wall on said frame and between said third and fourth auger elements, a passageway in said last-mentioned wall, a propeller means on said third auger element for moving liquid and doughnuts through said last-mentioned passageway, an exit passageway in said frame, a propeller means on said fourth auger element adjacent said exit passageway for causing liquid and doughnuts to pass through the same, and a chain means for operatively connecting all of said auger elements and said doughnut turning means to each other for synchronized movement.

5. In a doughnut cooking machine, a frame, a means for suspending said frame in a vat of hot cooking liquid, a plurality of horizontal auger elements rotatably mounted in said frame, some of which are spiraled in the opposite directions, vertical partition walls for separating said auger elements from each other, doughnut cake passageways in some of said walls, a double cup doughnut receiving and turning element S-shaped in cross-section and rotatably mounted on said frame, and an exit passageway in one of said partition walls; said horizontal auger elements having their lower portions in the hot cooking liquid of said vat and the upper portions above the surface of said hot cooking liquid.

6. In a doughnut cooking machine, a horizontal frame having its sides and ends closed and its top and bottom open, an auger element rotatably mounted in said frame and adjacent its right side wall, a second auger element rotatably mounted in said frame, parallel with said first-mentioned auger element but having its spiral thread in the opposite direction, a vertical wall partition on said frame located between said first and second-mentioned auger elements, a passageway in said wall, a propeller element on said first-mentioned auger element designed to cause hot cooking liquid and doughnuts to pass through said passageway, a third auger element rotatably mounted in said frame, parallel with said first-mentioned two auger elements and having a spiral thread similar to that of said first-mentioned auger element, a partition wall on said frame positioned between said second and third auger elements, a passageway in said last-mentioned partition wall, a rotatably mounted doughnut turning means on said frame and adjacent said last-mentioned passageway, a fourth auger element rotatably mounted in said frame parallel with said third-mentioned auger element and adjacent the left side wall of said frame, a vertical partition wall on said frame and between said third and fourth auger elements, a passageway in said last-mentioned wall, a propeller means on said third auger element for moving liquid and doughnuts through said last-mentioned passageway, an exit passageway in said frame, and a propeller means on said fourth auger element adjacent said exit passageway for causing liquid and doughnuts to pass through the same.

HOUSTON N. IRVINE.
KENNETH L. MAGEE.

REFERENCES CITED

The following references are of record in the file of this patent:

UNITED STATES PATENTS

| Number | Name | Date |
|---|---|---|
| 1,086,248 | Varian | Feb. 3, 1914 |
| 1,904,370 | Hunter | Apr. 18, 1933 |
| 2,018,419 | Richeson | Oct. 22, 1935 |
| 2,041,175 | Goodman | May 19, 1936 |
| 2,088,946 | Carpenter | Aug. 3, 1937 |
| 2,092,499 | Carpenter | Sept. 7, 1937 |
| 2,196,353 | Carlo | Apr. 9, 1940 |
| 2,299,080 | DeBack | Oct. 20, 1942 |